United States Patent [19]

Klar

[11] Patent Number: 5,566,577
[45] Date of Patent: Oct. 22, 1996

[54] DRIVING MECHANISM OF A WINDSCREEN WIPER FOR AN AUTOMOTIVE VEHICLE

[75] Inventor: Josef Klar, Löchgau, Germany

[73] Assignee: ITT Automotive Europe GmbH, Germany

[21] Appl. No.: 351,455

[22] PCT Filed: Jun. 4, 1993

[86] PCT No.: PCT/EP93/01423

§ 371 Date: Mar. 23, 1995

§ 102(e) Date: Mar. 23, 1995

[87] PCT Pub. No.: WO93/25415

PCT Pub. Date: Dec. 23, 1993

[30] Foreign Application Priority Data

Jun. 13, 1992 [DE] Germany .......................... 42 19 480.6

[51] Int. Cl.⁶ .................. B60S 1/24; F16H 21/52
[52] U.S. Cl. .................. 74/42; 15/250.13; 15/250.30; 74/600
[58] Field of Search ............... 74/42, 600, 117, 74/119, 533, 534; 15/250.13, 250.30, 250.31

[56] References Cited

U.S. PATENT DOCUMENTS

| 963,016 | 6/1910 | White ............................ 74/600 |
| 2,035,525 | 3/1936 | Bloss ............................ 74/41 |
| 2,324,894 | 7/1943 | Whitted ....................... 15/250.30 |
| 3,090,068 | 5/1963 | Brooks ......................... 15/250.17 |
| 4,263,821 | 8/1981 | Savage et al. ................. 74/42 X |
| 4,354,455 | 10/1982 | Looney ........................ 74/42 X |
| 5,133,221 | 7/1992 | Bruhn et al. ................. 74/25 |

FOREIGN PATENT DOCUMENTS

| 2240622 | 3/1975 | France . |
| 1480295 | 7/1969 | Germany . |
| 2335356 | 2/1974 | Germany . |
| 2655078 | 6/1978 | Germany . |
| 3405299 | 8/1985 | Germany . |
| 1128447 | 9/1968 | United Kingdom ........... 15/250.30 |

OTHER PUBLICATIONS

English Translation of International Preliminary Examination Report for Application PCT/EP93/01423 filed Jun. 4, 1993.

Primary Examiner—Charles A. Marmor
Assistant Examiner—Troy Grabow
Attorney, Agent, or Firm—J. Gordon Lewis; Thomas N. Twomey

[57] ABSTRACT

For changing the wiping angle in a driving mechanism of a windshield wiper for an automotive vehicle or for enabling varying wiping angles with the same parts both in a driving mechanism having a predetermined parking position and in a driving mechanism having no predetermined parking position, an actuated wheel of the gear between the driving motor and the wiper shaft includes at least two selectively used hinge points for the crank drive or at least one hinge point displaceable over the axis of rotation in the radial direction of the wheel, or a combination thereof.

7 Claims, 4 Drawing Sheets

DRIVING MECHANISM OF A WINDSCREEN WIPER FOR AN AUTOMOTIVE VEHICLE

BACKGROUND OF THE INVENTION

The present invention relates to a driving mechanism of a windshield wiper for an automotive vehicle, comprising a motor-driven wheel, in particular, a toothed gear, to which is eccentrically hinged one end of a toggle lever-type crank drive while the other end thereof is connected to the wiper shaft in a non-rotating way.

A wide variety of designs of windshield wiper systems for automotive vehicles provided with a driving mechanism of this type are well known in the art. Typical wiper systems include a wheel that is a toothed gear or, more precisely, a worm gear actuated by a worm which, in turn, is rotated by the electromotor. The rotating movement of this wheel or toothed gear is transformed with the aid of the toggle lever-type crank drive into a reciprocating or oscillating movement of the wiper shaft, with the two parts of the toggle lever-type crank drive being, in turn, also capable to be coupled to one another via toothed segments. It can be readily seen that in response to the eccentric hinge of the crank drive, with otherwise identical dimensions of the drive in general, varying wiping angles and also varying parking positions of the wiper shaft and, hence, of the wiper blade(s) vis-à-vis the windshield of the automotive vehicle are attainable. However, automotive manufacturers, in view of different configurations of the windshield to be wiped, desire different wiping angles and, in the event of windshield wipers having predetermined parking positions different parking positions. The toothed wheel, hitherto, has been specifically designed under consideration of the individual customer's requirement. This latter requirement in the first place refers to hinging the toggle lever-type crank drive on the toothed gear side, and in particular, it refers to the radial distance of the geometric axis of the toothed gear.

The fact that windshield wipers of this type, as a rule, are not produced by the automotive manufacturer but rather by an accessories manufacturer requires a special construction to be designed and manufactured for each windshield wiper, at least as far as the toothed gear is concerned. Conversely, windshield wiper system drives, virtually, are series-fabricated products in which even minor savings, below the line, may result in substantial cost reductions.

Accordingly, the problem addressed by this invention resides in so improving a driving mechanism of a windshield wiper for an automotive vehicle in order to permit more universal use with drives having at least varying wiping angles, but preferably also a predetermined parking position to be observed.

SUMMARY OF THE INVENTION

To solve this problem it is suggested, in the practice of the invention, to design the driving mechanism with an actuated wheel that was at least two selectively used hinge points for the crank drive where the crank drive has its other end connected to the wiper shaft in a non-rotating manner. Alternatively, at least one hinge point is over the axis of rotation in the radial direction of the wheel. As opposed to the prior known drives in which the toggle lever-type crank drive can be connected to the wheel or toothed gear in a specific predetermined way only, at least two different ways of connection have now been provided so that the driving mechanism of the invention can be used for at least two different driving mechanisms. For the sake of ease, reference will simply be made hereinafter to a "toothed gear" which is not intended to imply any restricted meaning.

The two selectively used hinge points can be provided on the toothed gear in a manner staggered with respect to one another either in the radial direction or both in the radial and in the circumferential direction. In case of a driving mechanism for a windshield wiper system with no specific parking position, the latter does not involve any problems. However, if a very special parking position is to be maintained provision will have to be made for enabling orientation in the rotating direction. Assuming that the toothed gear, in the parking position, has to take a very specific rotating position and that also the toggle lever-type crank drive, as regards the two rotary inversion points, must be hinged to the two ends thereof in a precisely predetermined way, it will be necessary for the driven wheel or toothed gear to be of a bipartite design.

In case of a step displaceable hinge point, provision will, of course, have to be made that any undesired displacement be precluded after a precise adjustment is made. That is, after adjustment, the connection is not allowed to disconnect automatically under the load occurring. In the case of a stepless displacement, the eccentricity can be randomly changed within predetermined limits. In case of a step-wise displacement at least two different adjustments are possible.

An especially preferred embodiment of the invention arises from the fact that the driven wheel is at least of a bipartite configuration, with the first part being motor-driven and the second part being provided with at least one hinge point for the crank drive. In all of the following forms of embodiment, the first part always is the part of the gear carrying the teeth which in the event of a worm wheel drive engage the actuated worm. If the second part of the bipartite toothed gear has two or three hinge points, the crank drive can be hinged to one of the two or three points, the radial distance of which from the geometric axis of the first part is, of course, different. The same applies to cases in which even more hinge points, (e.g. four), are provided as shown in the embodiment of FIG. 1, for example.

In that instance, the two parts of the driven gear can be interconnected in several relative positions so that it can be used with designs not only providing different wiping angles but also observing a precisely predetermined parking position. If the first hinge point is replaced by a second hinge point staggered by 90°, the second part must be turned by 90° over the first part so that the two hinge points—viewed in the circumferential direction of the first part—are identically arranged except, however, in the radial direction they have in each case a different distance from the geometric axis of the first part.

However, this gear can also be used for a driving mechanism not requiring a predetermined parking position. In that case, the second part need not be placed in staggered relationship via-a-via the second part if a desired other hinge point is chosen in place of the predetermined one.

Another embodiment of the invention is illustrated in FIG. 2. The cross shape is particularly advantageous because in the event of a displacement, the angle can be precisely maintained without requiring any special meters or the like. The second part of cross-shaped, multi-edged configurations of a corresponding design, preferably both parts, can be readily, quickly and precisely oriented over the first part.

This applies especially once the driving mechanism is formed as shown in FIG. 5. Fixing and orienting can be readily carried out with the aid of the two arms because it is sufficient to provide an element on the first part optionally cooperating with one of the counter elements on the four arms.

Another embodiment of the invention includes a slide that enables a stepless change in eccentricity of the end of the toggle lever-type crank drive provided on the side of the toothed gear. The range of displacement can be quasi extended in that—viewed in the direction of displacement—at least two different hinge points are provided for the knuckle Joint.

The slide, advantageously, includes two lateral mounting tongues each provided with an elongated slot extending in the direction of displacement, with the elongated slot being traversed by a mounting element. The length of the elongated slot in association with the thickness of the mounting element (preferably a screw) confines the maximum path of displacement of the second part vis-à-vis the first part. If screws are used as mounting elements they are screwed into threads provided in the first part, with the screw head directly or indirectly forcing the second part onto the first part after a previous radial displacement having taken place. The two mounting elements are not necessarily required to form, at the same time, stop elements in the end positions; the range of displacement can also be confined at a different point.

According to another embodiment of the invention, the first part of the driven wheel comprises a stop and/or adjusting means engaging an accommodating means of the second part. If it forms a pure stop element the mounting elements need not assume the function of end stops. If it is a pure adjusting element it will, of course, not be used for stop purposes but only for purposes of adjusting the eccentricity of the hinge point for the toggle lever-type crank drive. Nevertheless it will, of course, be possible for the adjusting element to confine or terminate the displacing movement of the second part at least in one of the two displacing end positions.

A preferred development of this embodiment includes an adjusting scale or scales. The scale preferably are lettered so as to enable direct adjustment of the eccentricity with the aid of such scales, i.e. they specify the amount, with the corresponding adjustment effected, by which the two geometric axes are spaced from one another in the radial direction. If the second part, advantageously, is displaceably mounted on the first part, the scales can also be asymmetrically formed, with the respectively minimum value being then in the center and the major up to the maximum values being on either side thereof.

Further embodiments of the invention will become apparent to those skilled in the art from the following description of a variety of embodiments as shown in the drawings.

DETAILED DESCRIPTION OF THE PREFERRED EMBODIMENTS

Figure 1:
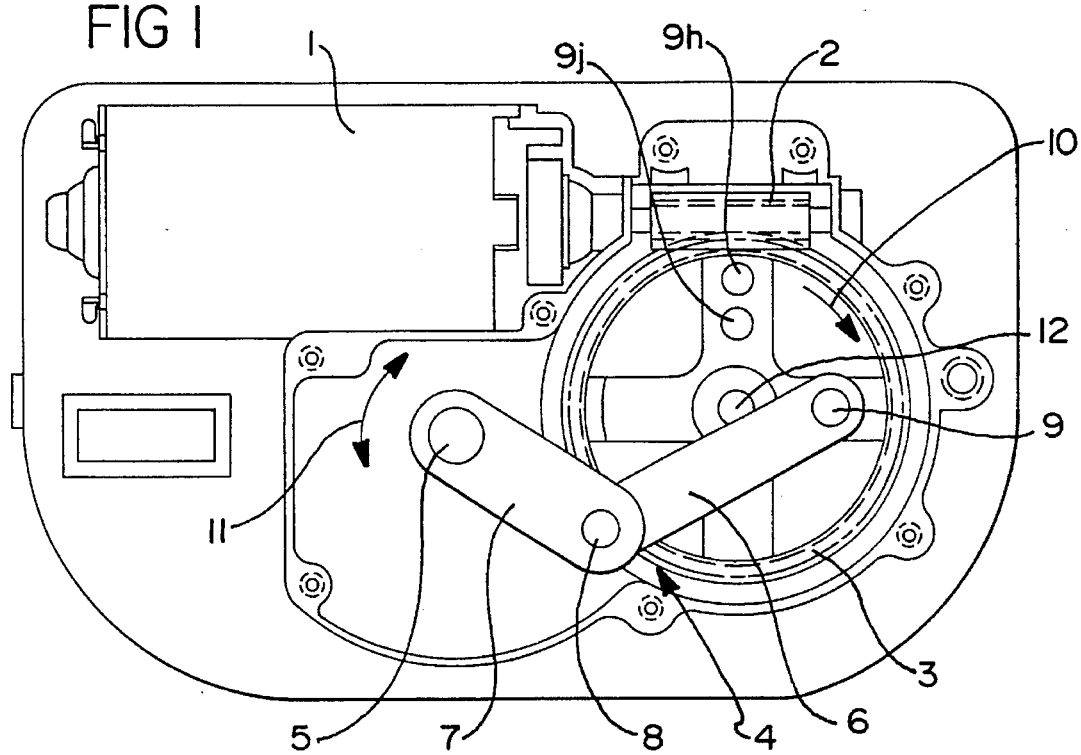
FIG. 1 is a plan view of the driving mechanism of a windshield wiper.

Now, referring first to FIG. 1, a worm 2 of a worm gear is actuated by an electromotor 1 of conventional design which worm, in its turn, rotates the appertaining wheel 3 preferably configured as a worm wheel. The rotating movement is transformed with the aid of a toggle lever-type crank drive 4 into an oscillating movement of a wiper shaft 5. The crank drive 4, in its turn, comprises the crank 6 and the tongue 7 interconnected through a swivel joint 8. The end of the crank 6 facing away from swivel joint 8, at a hinge point 9, is drive-connected by means of another swivel joint to the wheel 3 and the worm wheel, respectively. The end of the tongue 7 facing away from swivel joint 8, directly or indirectly, is connected in a non-rotating way to the wiper shaft 5. Actuating the worm wheel in the direction of arrow 10 with the aid of the electromotor 1 will result in the oscillating movement of the wiper shaft 5 in the direction of the dual arrow 11. Provided on the free end of the wiper shaft 5 is the wiper arm (not illustrated) carrying the wiping blade (not illustrated) for wiping the windshield of an automotive vehicle.

As can be readily seen, the wiping angle 11 is determined by the geometric dimensions of the drive; it varies when changing, for example, the hinge point 9 on the wheel 3 and the worm wheel, respectively.

If, in accordance with the invention, several selectively used hinge points 9 are provided on the wheel 3 and on the toothed gear or worm wheel, respectively, the wiper angle 11 can thereby be changed without using any additional or other parts.

Figure 4:
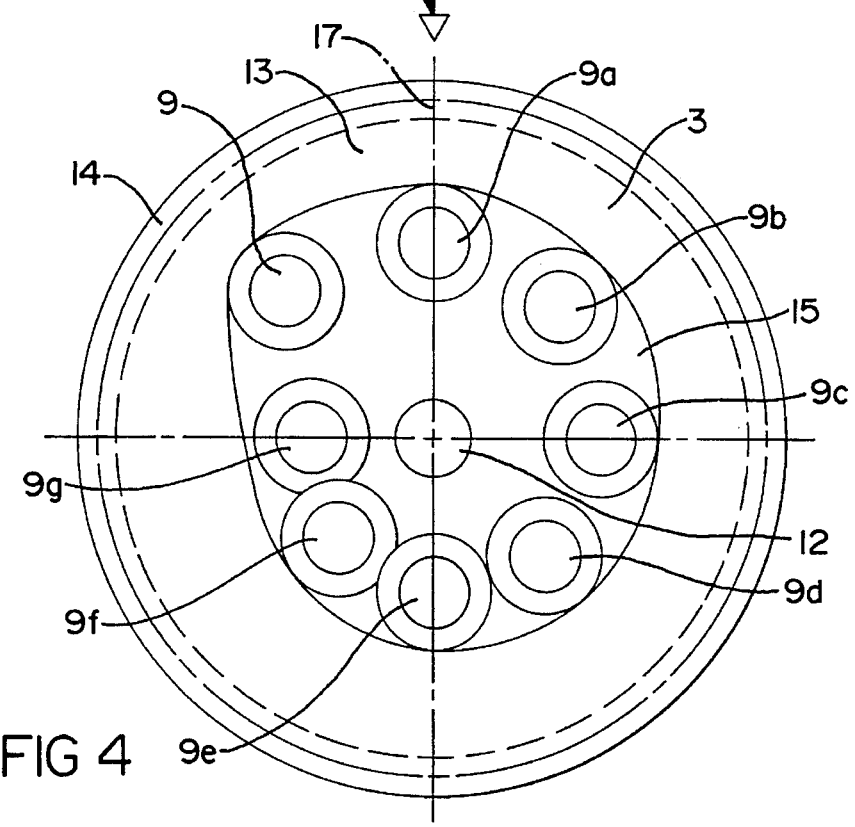
FIG. 4 is a view of another embodiment of the invention corresponding to the illustration of FIG. 2.

FIG. 4 shows, in enlarged scale, a wheel 3 comprising eight selectively used hinge points 9 through 9g. A radial distance from the hinge points to the bearing shaft 12 of the toothed gear decreases stepwise, starting from the hinge point 9, and ending at the hinge point 9g. If no special parking position is to be maintained for the wiper arm and, hence, for the wiper blade, the crank 6 can be connected to each of the said hinge points with no need to take into account any special requirements. However, if a special parking position is required, the hinge points 9 through 9g cannot be readily provided on the wheel 3 simply in the form of bores; rather a bipartite design of the wheel 3 will be required, with the toothing 14 being then on the first part 13 and the hinge points 9 through 9g being provided, for example, in the form of bores, on a second part 15 connected to the first part in a rotatable or displaceable manner. Once the wheel 3 is oriented over a mark 16, symbolically shown in FIG. 4 facing a radius or locating line 17 which radially extended from an axis 20, the second part is to be turned so that the desired hinge point and the geometric center thereof will be aligned with the radius 17. In that case the drive ensures the parking position required for the wiper arm.

Figure 2:
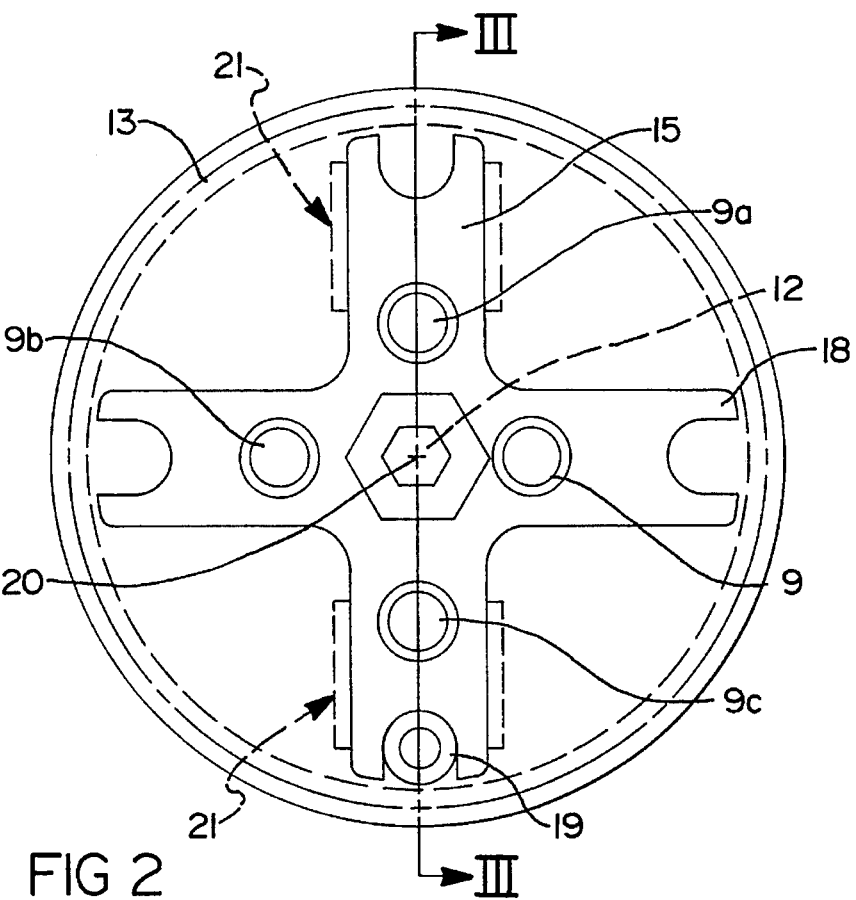
FIG. 2 shows, in enlarged scale, the wheel of the driving mechanism of FIG. 1 in a position staggered by 90°.
Figures 5, 6:
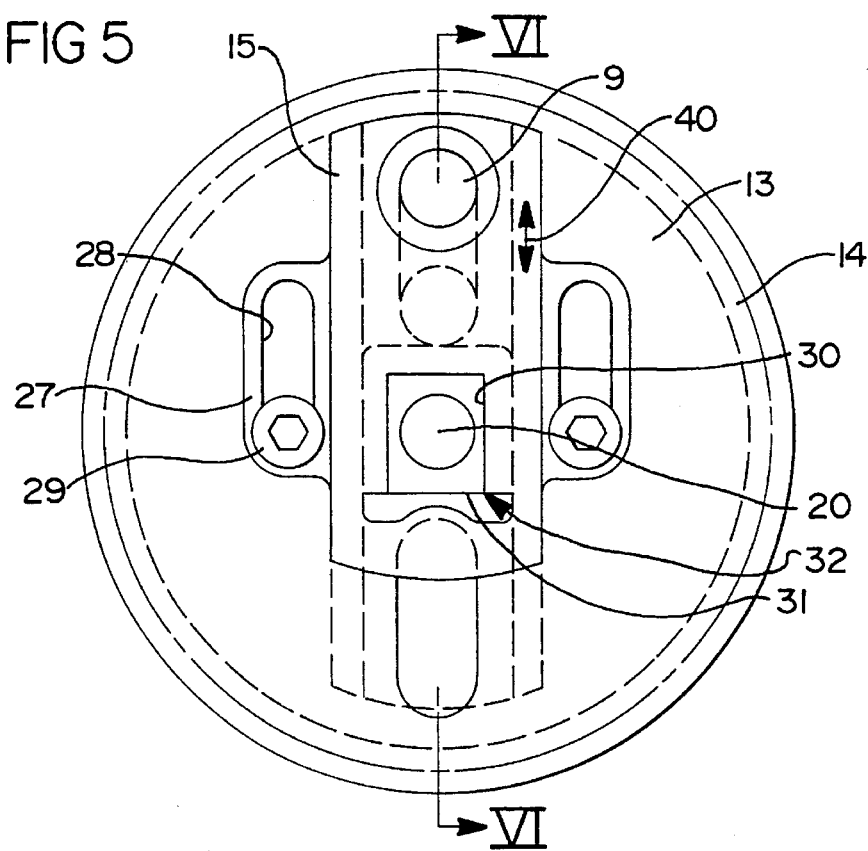
FIG. 5 shows a third embodiment of the invention corresponding to FIGS. 2 and 4, respectively.
FIG. 6 is a sectional view along the line VI—VI of FIG. 5.

FIGS. 1, 2 and 5 show two additional embodiments of the invention. According to FIG. 1, two selectively used hinge points 9h and 9j can be readily staggered with respect to one another in the radial direction so that the crank 6 can be readily displaced without changing the parking position, if it was previously hinged to one of the two hinge points 9h and 9j and if now a different wiping angle is to be attained. Otherwise, if crank 6 is hinged to another arm (i.e., at 9), a corresponding rotation by, for example, 90°, will have to be performed.

Figure 3:
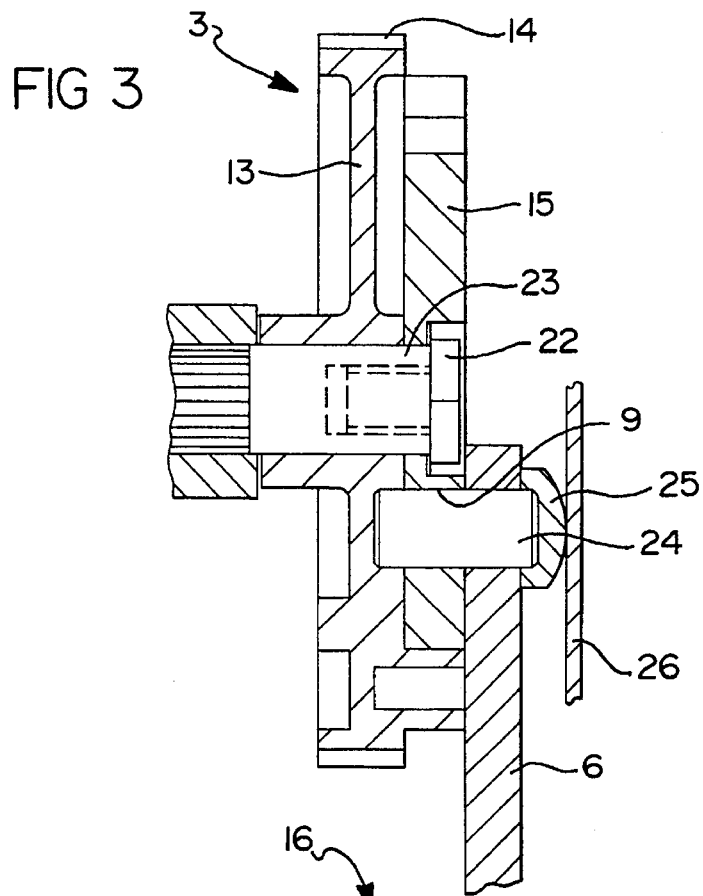
FIG. 3 is a sectional view along the line III—III of FIG. 2.

In the embodiment according to FIGS. 1 and 2, second part 15 can be mounted over the first part 13 in four positions respectively staggered by 90°. The second part 15, in that instance, is of a cross-type configuration. Each arm of the cross in an embodiment with a predetermined parking position, can be precisely oriented over the first part 13. For example, the free end 18 of second part 15 is of a fork-type configuration and the arm, in the position of use, cooperates with a roller 19 or the like. Each arm in this embodiment carries a hinge point 9 through 9c. The radial distance from each hinge point to the geometric axis 20 of the bearing shaft 12 varies. If one or more accommodating means are provided on the first part 13, a precise orientation and rotational strength of the second part 15 on the first part 13 can be achieved. An accommodating means 21 of this type can be formed, for example, by two parallel bands, with the space between them corresponding to the width of an arm. The first and the second part not only are required to be fixed with respect to one another but must also be firmly interconnected. This will specially apply in view of the threshold load on that part. This is effected, for example, by screw 22 as shown in FIG. 3, which is screwed into a nut thread of a bolt 23. In this embodiment a bolt 24 is inserted in the hinge point 9 formed as a bore in which bolt 24 can hook the associated end of the crank 6. On the free end, bolt 24 carries a cap 25 which, during operation, is in abutment with a lid 26 or a holding bracket or the like below a gear lid which, in FIG. 1, has been removed and completely covers the drive in a conventional manner.

A stepwise displacement is possible in the previously described embodiments. The embodiment according to FIGS. 5 and 6 provides for a stepless displacement of the hinge point 9. Here, too, a bipartite wheel 3 is used. The second part 15 is configured as a slide, lockable and displaceable on the first part 13 in the radial direction, i.e. in the direction of the dual arrow 40. A corresponding slide guide formed by two lateral mounting tongues 27 respectively comprising an elongated slot 28 extending in the direction of displacement is provided. A mounting element, for example, the shaft of a fixing screw 29, is passed therethrough and is screwed into a corresponding nut thread of the first part 13. The maximum path of displacement is determined by the length of the elongated slot 28 and the diameter of the screw shaft. Incidentally, the second part 15 can be removed and remounted in a position turned by 180°. In view of an asymmetrical configuration in the central area, another change in the hinge point over the geometric axis of rotation 20 of the wheel 3 can be achieved in this way.

The second part 15, in this embodiment, includes a central, window-type break-through 30 having longitudinal edges extending in the direction of displacement, and transverse edges normal thereto. A band 31 of the first part 13, projecting in a direction perpendicular to the image plane, in a displacing end position, can be applied to one of the transverse edges. At the same time band 31 can form an adjusting mark that can be used in connection with one or two adjusting scales 32 for adjusting the hinge point 9. In accordance with FIG. 6, the protruding free end of the bearing bolt 24 preferably carries a cap 25 which can slide along the inner face of the lid 26 in a supporting manner. The inner bolt end projects toward the first part 13 to engage a groove 33 of the first part 13 extending in the radial direction.

Figure 7:
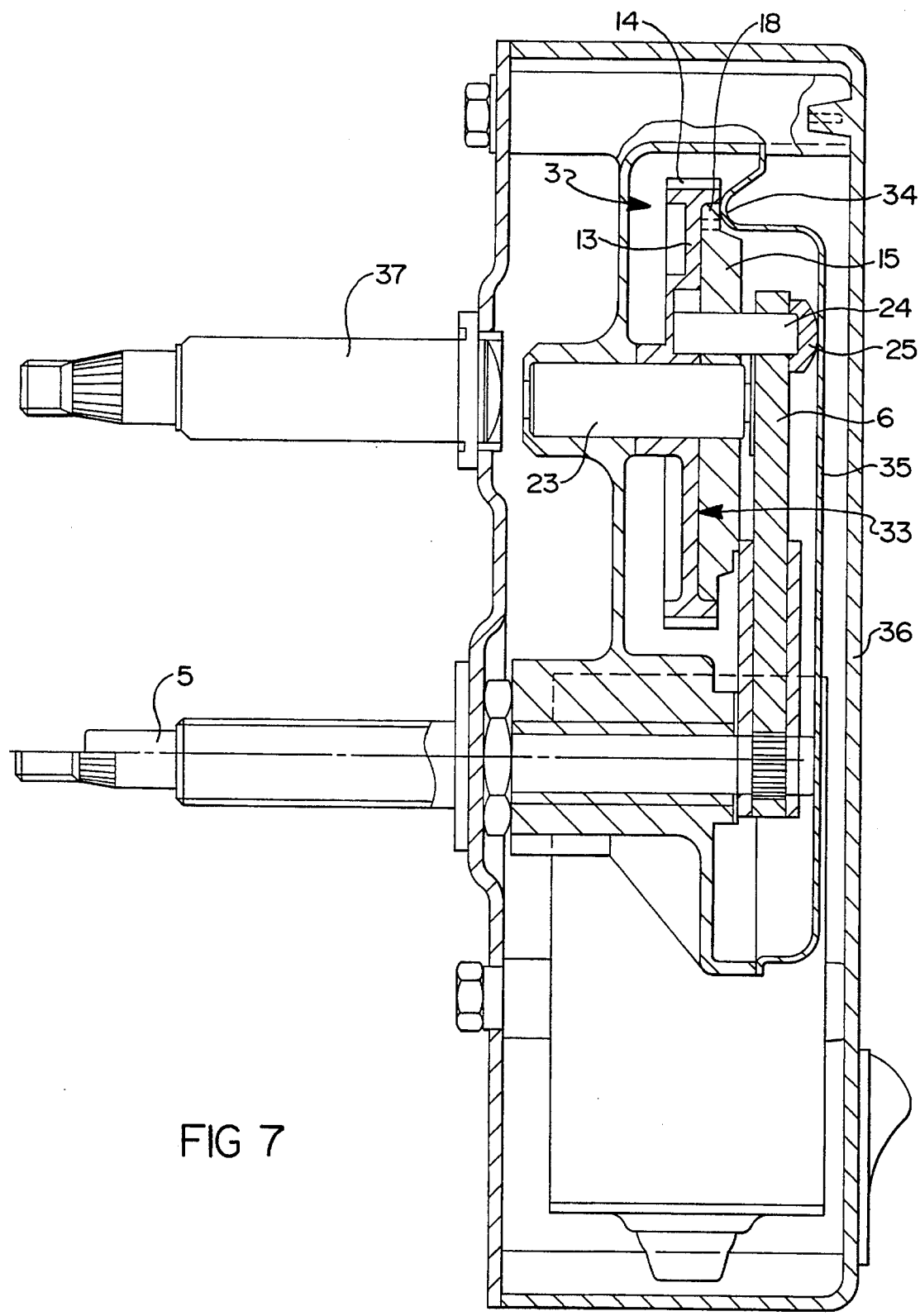
FIG. 7 is an embodiment slightly modified over FIG. 3.

FIG. 7 shows another embodiment comparable to but modified over FIG. 3. The wheel 3, which preferably is again a worm wheel, is of a cross-section arising from FIGS. 3 or 7, i.e. the central area, for weight reducing purposes, is of a reduced strength thereby forming a depression 33 suitable to accommodate the second part 15 flush with the surface. In this way, the overall strength of the first part 13 and the second part 15 is decreased. As shown in FIG. 2, the second part 15 at the free end 18 thereof can be of a fork-type configuration so that projections can be quasi provided on the rear side or inner side of the toothing 14 which protrude radially toward the bolt 23 and are molded to the first part 13 and correspond to the rollers 19 or the like as shown in FIG. 2. If a radial second part 15 having four arms is provided, four projections respectively staggered by 90° and protruding inwardly are, of course, accordingly provided on or molded to the first part 13. In the area of this form-locking connection, the second part 15 is of approximately half the strength only. Moreover, a bead 34 of a bracket 35 or of an inner lid is provided therein for locking the connection between the first and second parts against disconnection. The gear is externally close.

In this form of embodiment of the driving mechanism, an extra wiper shaft 37 is provided in addition to the wiper shaft 5. The free end of shaft 37 accommodates an additional wiper arm thereby providing a parallel control drive for the wiper blade.

I claim:

1. A driving mechanism for use in vehicle windshield wiper system having a windshield wiper arm coupled to a wiper shaft, the driving mechanism comprising:

a motor having a gear and operably rotating said gear;

a first wheel part supported by a bearing shaft for concentric rotation about an axis of said bearing shaft and having gear teeth on an outer perimeter of said first wheel part engaged by said gear and having a locating line extending radially from said axis;

a second wheel part having an adjustment feature facilitating the second wheel part being fixed to said first wheel part at a selected orientation and together with the first wheel part cooperatively defining at least two selectively used hinge points with said hinge points being unequally radially spaced from said axis of said bearing shaft; and a crank drive member having a first end hinged to a selected one of said hinge points, a second end of said crank drive member being coupled to the wiper shaft such that rotation of said first wheel part cause movement of the wiper shaft to perform a windshield wiping operation, wherein said selected one of said hinge points is fixed in a predetermined angular position with respect to said locating line of said first wheel to assure that the wiper arm is in a park position when the windshield wiping operation terminates.

2. The mechanism of claim 1, wherein said second wheel part comprises a slide member that is slidably coupled to said first part such that said slide member slides in a straight line in a radial direction relative to said wheel axis.

3. The mechanism of claim 2, wherein said slide member comprises two slots extending in said radial direction, said slots cooperating with a mounting element on said first wheel part.

4. The mechanism of claim 2, wherein said first wheel part comprises an adjusting member that engages an accomodating means on said second wheel part.

5. The mechanism of claim 4, wherein said adjusting member comprises a band projecting from said first wheel part in a direction transverse to a plane of said wheel and wherein said accomodating means comprises a window defined at least partially through said second wheel part.

6. The mechanism of claim 1, wherein said second wheel part comprises a generally cross-shaped member having a plurality of arms, said at least two hinge points being respectively disposed on said arms.

7. The mechanism of claim 6, further comprising at least one hinge point on said second wheel part that is moveable in a radical direction relative to said wheel axis.

* * * * *